Dec. 22, 1931.  A. M. KAMPER  1,837,908
AUTOMATIC CHANGE SPEED GEAR
Filed June 30, 1930   4 Sheets-Sheet 1

INVENTOR
A. M. Kamper
by [signature] Atty.

Dec. 22, 1931.  A. M. KAMPER  1,837,908
AUTOMATIC CHANGE SPEED GEAR
Filed June 30, 1930  4 Sheets-Sheet 3

INVENTOR
A. M. Kamper
by [signature] Atty.

Patented Dec. 22, 1931

1,837,908

UNITED STATES PATENT OFFICE

ANDREW MATHIS KAMPER, OF CARLTON, VICTORIA, AUSTRALIA

AUTOMATIC CHANGE SPEED GEAR

Application filed June 30, 1930, Serial No. 465,037, and in Australia March 26, 1930.

This invention relates to an automatic change speed gear so designed as to provide a gradual change of speed from a fixed low gear to high gear, and to automatically vary the speed and also proportionate the gear ratio according to the load imposed.

The improved gear can be used with every type of engine where variation of speed is required in accordance with the load imposed, but it is particularly adaptable for use in connection with the transmission gear of motor-vehicles.

The improved gear according to the invention embodies the balance gear as described in my prior United States Patent No. 1,721,123 dated July 16, 1929, and is characterized principally by the provision of a definite fixed low gear in lieu of a speed variation from zero and the utilization of the balance gear to provide a gradual change of gear ratio from said fixed low gear to a definite high gear. Means are provided for utilizing the variation of the torque reaction for changing from the fixed low gear to the balance gear. The torque reaction also automatically controls the engagement of the clutch to vary the gear ratio according to the load imposed.

Figure 1:
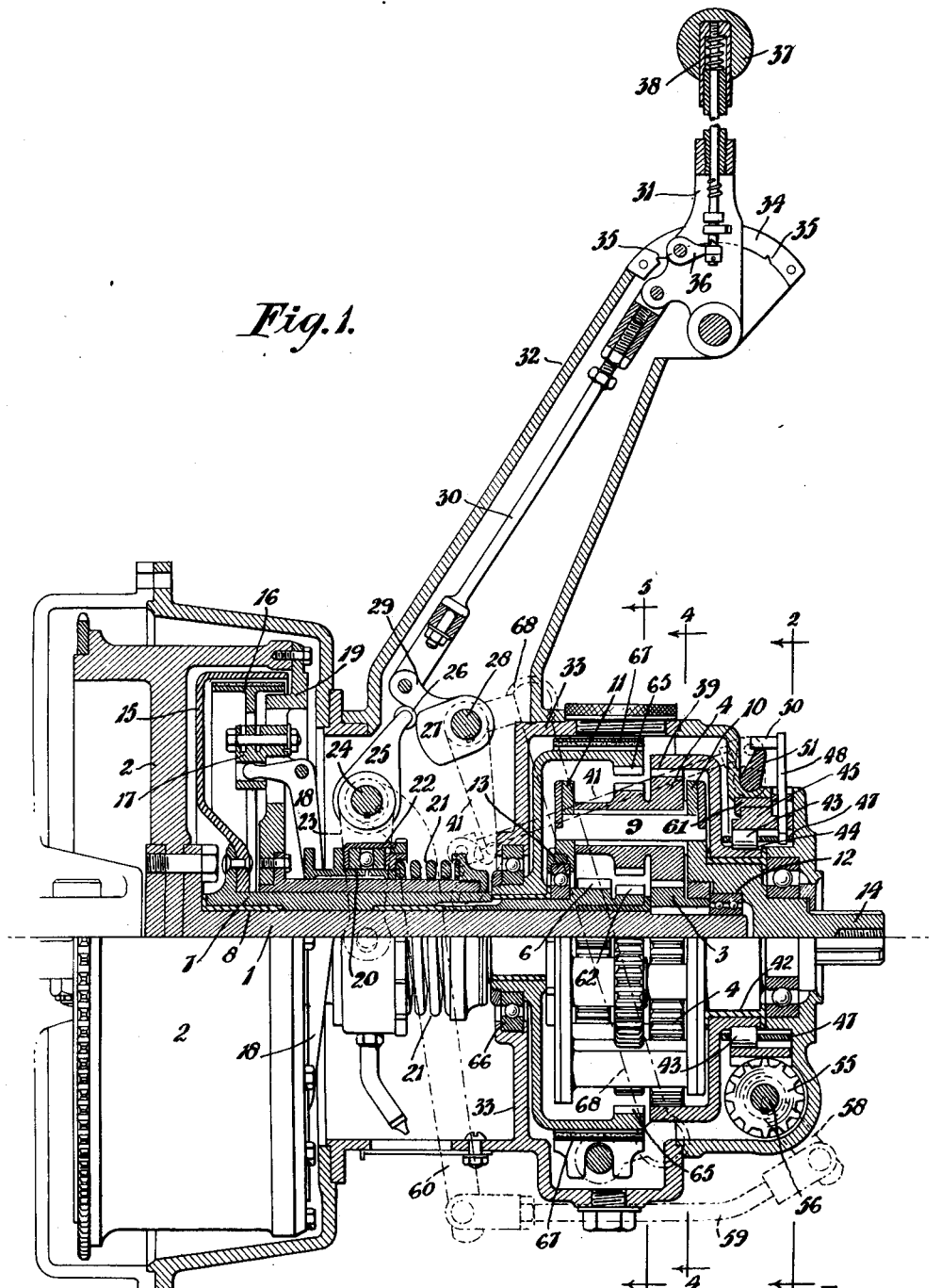
Figure 1 is a view in longitudinal section of the improved change speed gear according to the invention.
Figure 4:
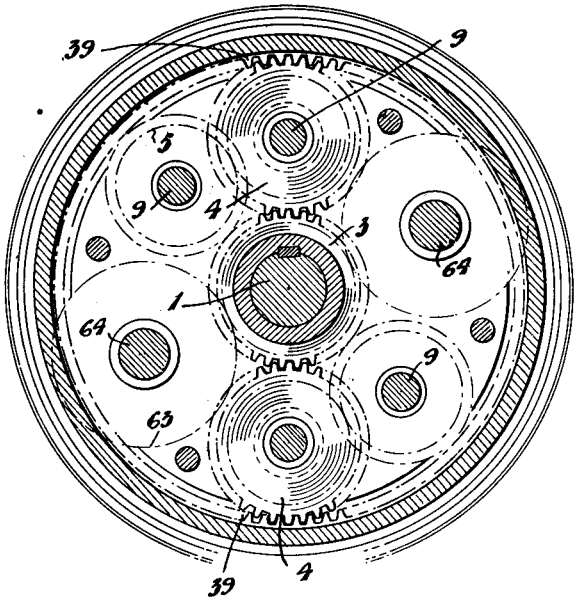
Figure 5:
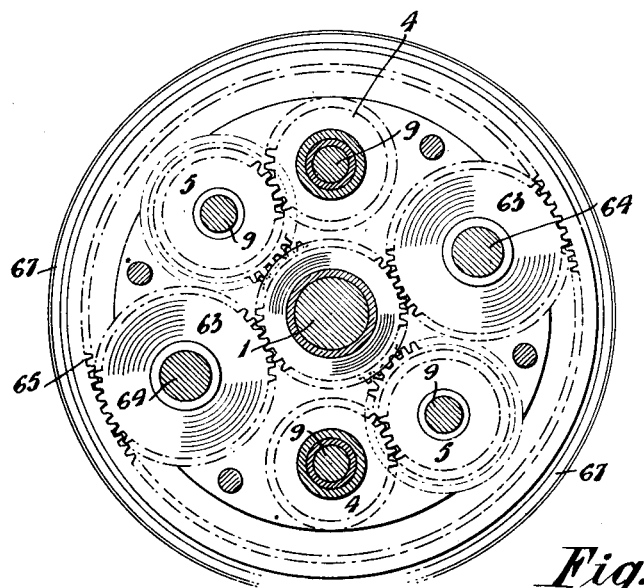

Figures 4 and 5 are sectional views taken on the lines 4—4 and 5—5, respectively, of Figure 1.

Figure 6:
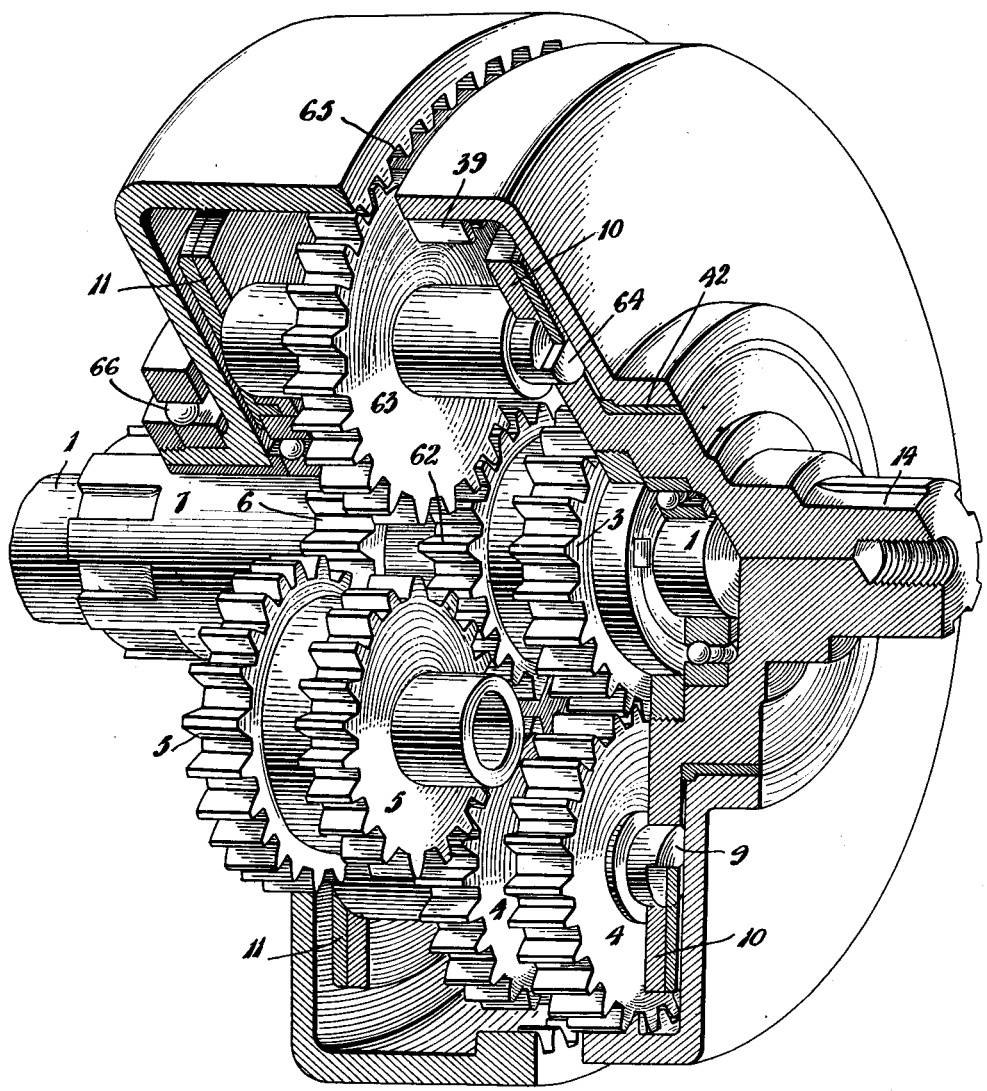

Figure 6 is a perspective view of the gears shown in Figures 4 and 5.

The change speed gear illustrated in these views is intended principally for use on motor-vehicles. 1 indicates the driving shaft of the gear and 2 the engine fly wheel, both of which parts are bolted to the crankshaft of the motor. A driving gear 3 is keyed on the end of the shaft 1 and is meshed with two pinions 4 of the balance gear. Said pinions 4 are of stepped construction as shown in Figure 1 and are in mesh with other pinions 5 also of stepped construction which, in turn, mesh with a gear 6, see Figures 4 and 5. The gear 6 is formed integrally on a driven shaft 7 which is of tubular form and is arranged concentrically about the driving shaft 1, preferably being supported therefrom by suitable bearing bushes 8.

The pinions 4 and 5 are loosely mounted on spindles 9 which at their ends are fixedly supported in a balance wheel. Said balance wheel comprises two parts 10 and 11 rigidly bolted together and freely supported on the shafts 1 and 7 by means of ball-bearings 12 and 13. The balance wheel is coupled to the propeller shaft of the motor-vehicle by means of a universal joint which connects to the splined extension 14 of said balance wheel.

A clutch of the internal expanding type is used in conjunction with the balance gear and consists of a drum 15 rigidly secured to the end of the driven shaft 7 and pivoted shoes 16 which are operated by means of toggles 17 and pivoted levers 18. The shoes 16 are supported by a plate 19, which is rigidly bolted to the fly-wheel 2 so as to rotate therewith in the same direction and at the same speed as the driving shaft 1.

The outer ends of the levers 18 engage the grooved end of a sliding sleeve 20 whereby said levers are actuated in accordance with the axial movement of said sleeve. A spring 21 exerts pressure on the sliding sleeve 20 tending to move it forwardly and thereby cause the shoes 16 to be expanded into engagement with the drum 15.

The sleeve 20 supports a ball thrust bearing 22. Said bearing is connected to two arms 23 which are rigidly keyed on a spindle 24. Rotation of said spindle 24 thus causes axial movement of the sliding sleeve.

A lever 25 is fixed on the spindle 24 and at its end carries a roller 26 engaging a cam 27 which is mounted rigidly on a spindle 28. Said spindle 28 has two arms 29, which are connected by linkage 30 to a pivoted operating handle 31. Said handle 31 is placed on the upper part of a pillar 32 which is suitably secured to the outer casing 33 of the gear. The central position of the handle 31 is neutral, the forward position is forward drive and the rear position is reverse drive.

To retain the operating handle 31 in any of its three positions, a quadrant 34 having notches 35 in its lower edge is provided to receive a pawl 36 pivoted to the operating handle. This pawl is connected to a knob 37 on the upper end of the operating handle. A spring 38 normally maintains the pawl in engagement with the quadrant notches. When the knob 37 on the operating lever 31 is depressed the pawl 36 disengages from the quadrant notches thus permitting the operating handle to be pivotally moved.

The low gear mechanism comprises an internally toothed gear wheel 39, a roller clutch 40 and a system of levers 41 (shown in dotted lines in Figure 1), connecting said roller clutch to the spindle 28.

The internal gear wheel 39 is freely supported on the balance wheel part 10 by means of a bearing bush 42 and its teeth are in mesh with the two pinions 4 of the balance gear, see Figure 6. The roller clutch 40 consists of a series of rollers 43 placed around an extended part 44 of the internal gear 39, and an outer ring 45 provided with inclined recesses 46 to house said rollers. The rollers are held in position by a cage 47 which is capable of being partly rotated to engage or disengage the rollers.

Figure 2:
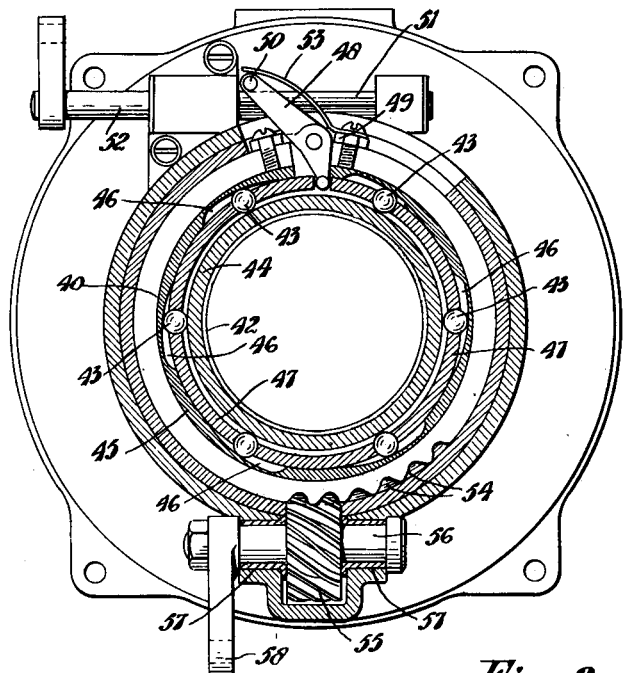
Figure 2 is a cross-sectional view on the line 2—2 of Figure 1, the roller clutch being shown in engaged position.
Figure 3:
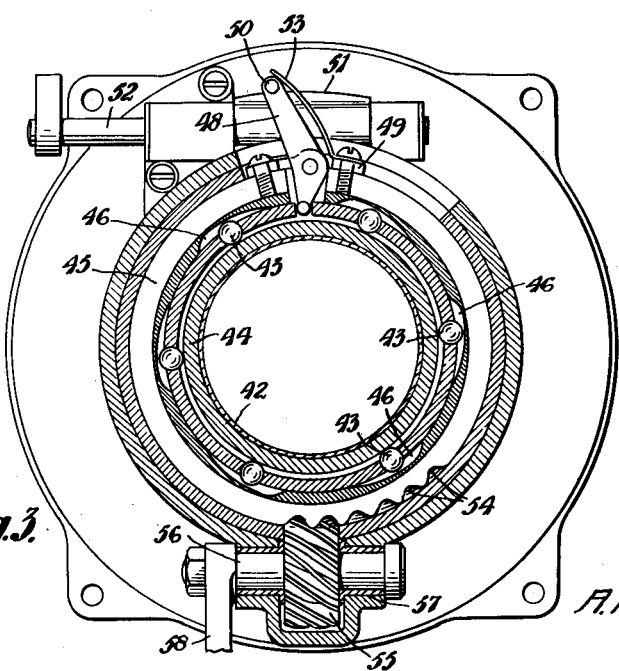
Figure 3 is a view similar to Figure 2, but showing the roller clutch disengaged.

The cage 47 is operated by means of a bell-crank lever 48 pivoted in a suitable bracket 49 in the outer ring 45. The outer end of the bell-crank lever 48 has a pin 50 adapted to be operated by an elongated cam 51 mounted on a horizontal spindle 52. Rotation of the spindle 52 causes the cam 51 to operate the bell-crank lever 48, thus effecting movement of the cage 47 controlling the roller clutch. A flat spring 53 tends to keep the clutch in the engaged position. Figure 2 clearly shows the roller clutch 40 in engaged position, while Figure 3 shows the position of the parts when the clutch is disengaged.

The system of levers 41 is so arranged as to connect the spindles 52 and 28 so that forward movement of the operating handle 31 engages the roller clutch 40 and the neutral position of said handle 31 corresponds with the disengaged position of the roller clutch. Rearward movement of the handle 31 leaves the roller clutch in disengaged position.

The roller clutch 40 when engaged arrests the turning motion of the internal gear 39 in the reverse direction to the driving shaft 1, but allows it to revolve freely in the same direction as said driving shaft.

The lower part of the outer ring 45 is provided with spiral teeth 54 meshing with a spirally toothed pinion 55. The axes of said spiral gears are at right-angles to one another. The shaft 56 of the pinion 55 is supported in the outside casing 33 by means of bearing bushes 57 and at its end it is fitted with a lever 58. Said lever 58 is connected by a link 59, shown in dotted lines in Figure 1, to lever 60 rigidly fitted on the spindle 24 at one end thereof.

The outer ring 45 is freely supported in the outside casing 33 by means of a bush 61 and it can rotate to a certain degree in either direction so as to cause a corresponding turning movement of the pinion 55 and lever 58.

The reverse gear comprises a gear 62 formed integrally on the driven shaft 7 and meshing with two idler pinions 63, see Figure 6. Said pinions are freely supported on spindles 64 which at their ends are rigidly secured in the balance wheel parts 10—11. An internal gear 65 meshes with the idler pinions 63 and is freely supported between the driven shaft 7 and a ball bearing 66 supported by the casing 33. A contracting brake band 67 is placed around the outside surface of the internal gear 65 and is operated through lever mechanism 68 from the spindle 28, see dotted lines in Figure 1.

Contraction of the brake band 67 is effected only when the handle 31 is moved rearwardly.

The operation of the improved change speed gear is as follows:

When the gear is in the neutral position, the integers are in the positions shown in Figure 1. The driving shaft 1 is rotated by the crankshaft of the motor and the balance wheel 10—11 remains stationary, being connected to the propeller shaft of the vehicle. The driving gear 3 drives pinions 4 which roll within the internal gear 39 and cause same to rotate in the opposite direction to the driving shaft 1 at a reduced speed corresponding to the ratio of the driving gear 3 and internal gear 39. The roller clutch 40 is in its disengaged position and the internal gear 39 thus rotates freely on the bearing bush 42.

The pinions 4 also drive the meshing pinions 5, which in turn, drive the gear 6 thus rotating the shaft 7 and the drum 15 in the reverse direction to the driving shaft 1 with a speed corresponding to the ratio of driving gear 3, pinions 4 and 5 and gear 6.

The internal gear 65 is freely rotated in the same direction as the driving shaft 1 through the gear 62 and idler pinions 63 with a reduced speed corresponding to the ratios of gear 62 and internal gear 65.

The operating handle 21 is in neutral or central position and by the engagement of the cam 27 and arm 25 the sleeve 20 is held retracted against the spring 21 so that the shoes 16 are maintained clear of the inner surface of the drum 15. Said drum 15 and the driven shaft 7 are thus free to rotate without any retardation.

When a forward drive is to be transmitted to the motor-vehicle, the operating handle 31 is gradually moved forward until the pawl 36 engages the forward drive notch 35.

Through the system of levers 41 and bell-crank lever 48, the cage 47 of the roller clutch 40 is partially rotated to the engaged position causing the rollers 43 to be moved to the narrow ends of the wedge-shaped recesses 46. The internal gear 39 is thus rigidly locked to the outer ring 45 and the rotation of the internal gear 39 in the reverse direction to the driving shaft 1 is arrested.

The internal gear 39 being held stationary, the pinions 4 now roll within said internal gear and cause the balance wheel 10—11 to be rotated in the same direction as the driving shaft 1, but with reduced speed corresponding to the gear ratio of the driving gear 3 and internal gear 39. The balance wheel 10—11 being connected to the propeller shaft of the motor-vehicle, the vehicle commences to move forwardly on low gear.

During the forward movement of the handle 31 and simultaneously with the engagement of the roller clutch 40, the cam 27 disengaged from the roller 26. The sliding sleeve 20 is thus caused to be moved forwardly under the action of the spring 21 and the shoes 16 are thereby expanded against the drum 15, causing the rotation of said drum to be retarded to thus prevent a sudden jerk being produced by the instantaneous action of the roller clutch 40.

The engagement of the shoes 16 with the drum 15 is more or less only momentary, as said shoes are immediately afterwards disengaged by the operation of the torque device 45. The torque reaction is acting on the internal gear 39 and on the engaged roller clutch 40 tending to cause them to be turned in the direction opposite to the rotation of the driving shaft 1. When the vehicle is starting, the value of the torque reaction is high and is sufficient to overcome the action of the spring 21 holding the clutch shoes 16 in engagement. Under the action of the high torque reaction the outer ring 45 is partially rotated. This movement is transmitted to the pinion 55 and by the system of levers 59—60 the sliding sleeve 20 is moved rearwardly and disengages the shoes 16 from the drum 15.

If the torque reaction remains high for any length of time, such as by way of example, may happen when the vehicle is started on a hill, the shoes 16 are maintained disengaged and the vehicle remains in low gear. Normally, however, the value of the torque reaction gradually decreases under the acceleration of the vehicle. The tension of the spring 21 is balanced against the torque reaction, and as the torque reaction gradually decreases the outer ring 45 returns gradually to normal position under the action of the spring 21. The sliding sleeve 20 is moved forwardly and gradually engages the shoes 16 with the drum 15.

The clutch 15—16 is thus engaged gradually in accordance with the gradual decrease of the torque reaction. The engagement of the parts 15—16 causes the speed of the drum 15 to be gradually retarded and this retardation causes corresponding increase of the speed of the balance wheel 10—11. This increase of speed of the balance wheel takes place until the shoes 16 are fully engaged with the drum 15 and said drum and flywheel 2 rotate at equal speed in the same direction.

The increase in speed of the balance wheel 10—11 causes the internal gear 39 to commence to rotate in the same direction as the driving shaft 1. From this moment the torque reaction does not act on the internal gear 39, and the roller clutch 40 permits said internal gear to revolve freely. When the shoes 16 are fully engaged, the shafts 1 and 7, the balance wheel 10—11, and the internal gear 39 are rotated in the same direction with the same speed and a top gear or direct drive to the propeller shaft of the vehicle thus takes place.

When the vehicle travels up a gradient which is beyond the power of the engine to ascend in direct drive transmission, the increased torque reaction overcomes the friction torque between the drum 15 and shoes 16 and thus tends to lower the speed of the internal gear 39 and also the speed of the balance wheel 10—11, thus gradually reducing the gear ratio. This variation of gear ratio takes place until the internal gear 39 commences to rotate in the reverse direction. Said gear 39 is then automatically arrested by the engagement of the roller clutch 40 which holds said gear stationary. The torque reaction acting through the outer ring 45 and the parts 55, 59 and 60 automatically causes the sleeve 20 to be retracted, thus disengaging the shoes 16 from the drum 15 and placing the mechanisms in low gear. Depending on the load imposed, the gear may automatically change down either completely to the fixed low gear, or to any intermediate gear ratio between the high gear and fixed low gear, such automatic variation being governed by the value of the torque reaction.

To stop the motor vehicle, the operating handle 31 is moved to the neutral position, which action causes the sliding sleeve 20 to be moved rearwardly and disengage the shoes 16. Simultaneously, the cage 47 is partially rotated to the disengaged position, thus permitting the internal gear 39 to rotate freely in the reverse direction to the driving shaft 1 and no drive is transmitted to the propeller shaft.

Reverse drive is obtained by moving the operating handle 31 rearwardly. This action causes the brake band 67 to be contracted and grip the internal gear 65, which is thus held stationary. The rotation of the gear 62 causes the idler pinions 63 to roll in the stationary internal gear 65 and drive the balance wheel 10—11 in the reverse direction with a fixed reduced speed. During the reverse drive position the roller clutch 40 and the clutch 15—16 remain disengaged.

It will be understood that the details of construction can be altered to suit various requirements of the power to be transmitted. For example, the ratio of the low and reverse gears and type of clutch 15—16 could be altered.

It is possible to substitute a foot pedal for the operating handle 31 so that the neutral position is effected when the foot pedal is depressed and forward drive comes into operation when the foot pedal is released. A separate handle or pedal for the reverse drive will be necessary in this case.

The operation of the automatic change speed gear could be effected also from the steering column by means of a lever placed on a quadrant.

What I do claim is:

1. An automatic change speed gear comprising, a balance wheel connected to the propeller shaft, gearing carried by said balance wheel and driven from a driving shaft, a clutch member driven through said gearing on the balance wheel, a gear member meshing with the gearing on the balance wheel, means for holding said gear member stationary to cause the balance wheel to be driven at a fixed low gear, means for retarding the rotation of the clutch member to cause corresponding increase in the speed of the balance wheel, means utilizing torque reaction from the propeller shaft for variably controlling said retarding means to provide a variable change of gear ratio from the fixed low gear to high gear, a second gear member, idler gears journaled in said balance wheel and meshing with said second gear member, means for rotating said idler gears, and means for arresting rotation of said second gear member to cause the balance wheel to be driven in a relatively reverse direction.

2. A change speed gear as in claim 1 and wherein the means for holding the gear member stationary comprise a clutch operatable by means of a handle.

3. A change speed gear as in claim 1 and wherein the clutch member consists of a drum driven in the reverse direction to the driving shaft and the retarding means comprise expansible shoes to engage the drum, said shoes being rotated in the same direction as the driving shaft.

4. A change speed gear as in claim 1 and wherein the retarding means are operated by means of a sliding sleeve which is also connected to the torque reaction means.

5. A change speed gear as in claim 1 and wherein the torque reaction means comprise a member capable of movement under the torque reaction, a spring balanced against said torque reaction and means connecting said member to the clutch member retarding means.

6. A change speed gear as in claim 1 and wherein the torque reaction means, comprises an outer ring associated with the gear member meshing with the balance wheel gearing and connections between said ring and the retarding means for the clutch member.

7. In a change speed gear of the type described, a balance wheel, gearing carried by said balance wheel and driven from a driving shaft, a gear member meshing with said gearing, a clutch for arresting rotation of said gear member in one direction and an outer ring associated through said clutch with said gear member and capable of movement under the torque reaction.

8. In a change speed gear the combination as in claim 7 and including teeth on said outer ring, a gear engaging said teeth, and a spring balanced against the torque reaction to return said ring to normal position as the torque reaction decreases.

9. An automatic change speed gear comprising, a balance wheel connected to the propeller shaft, gearing carried by said balance wheel and driven from a driving shaft, a clutch member driven through said gearing on the balance wheel, shoes or like contact members, spring means for engaging said shoes with the clutch member to retard its rotation and cause corresponding increase in speed of the balance wheel, a gear member meshing with the gearing on the balance wheel, a roller clutch associated with said gear member and adapted to arrest its rotation to cause the balance wheel to be driven at a fixed low gear, an outer ring in said roller clutch capable of partial rotation under the action of the torque reaction, spring means tending to maintain the shoes in engagement with the clutch member, and means connecting the outer ring of the roller clutch with the shoe engaging means whereby the torque reaction acts against the spring means to control the engagement of the shoes.

10. An automatic change speed gear according to claim 9 and including a control lever movable to forward, neutral and reverse positions, and connections between said lever and the roller clutch and the means for engaging the shoes with the clutch member.

11. An automatic change speed gear according to claim 9 and including a sliding sleeve connected to the clutch shoes, a spring a ting on said sleeve tending to force the shoes into engagement and connections between said sleeve and the outer ring of the roller clutch.

In testimony whereof I affix my signature.

ANDREW MATHIS KAMPER.